(12) United States Patent
Zhang et al.

(10) Patent No.: US 11,539,103 B2
(45) Date of Patent: Dec. 27, 2022

(54) OVERCHARGE PROTECTION DEVICE WITH UNEVEN TERMINAL PADS

(71) Applicant: CPS Technology Holdings LLC, New York, NY (US)

(72) Inventors: Xugang Zhang, Shorewood, WI (US); Jason D. Fuhr, Sussex, WI (US)

(73) Assignee: CPS Technology Holdings LLC, New York, NY (US)

( * ) Notice: Subject to any disclaimer, the term of this patent is extended or adjusted under 35 U.S.C. 154(b) by 86 days.

(21) Appl. No.: 16/764,324

(22) PCT Filed: Nov. 20, 2018

(86) PCT No.: PCT/US2018/062121
§ 371 (c)(1),
(2) Date: May 14, 2020

(87) PCT Pub. No.: WO2019/100076
PCT Pub. Date: May 23, 2019

(65) Prior Publication Data
US 2020/0280046 A1    Sep. 3, 2020

Related U.S. Application Data

(60) Provisional application No. 62/588,581, filed on Nov. 20, 2017.

(51) Int. Cl.
*H01M 50/578* (2021.01)
*H01M 50/543* (2021.01)

(52) U.S. Cl.
CPC ....... *H01M 50/578* (2021.01); *H01M 50/543* (2021.01); *H01M 2200/20* (2013.01)

(58) Field of Classification Search
CPC ............. H01M 50/578; H01M 50/572; H01M 6/5044; H01M 50/574; H01M 50/583;
(Continued)

(56) References Cited

U.S. PATENT DOCUMENTS

| 2005/0112456 A1* | 5/2005 | Kozu | .................. H01M 50/583 |
| | | | 429/62 |
| 2011/0052949 A1* | 3/2011 | Byun | .................. H01M 50/572 |
| | | | 429/61 |

(Continued)

FOREIGN PATENT DOCUMENTS

| CN | 102005597 A | 4/2011 |
| CN | 104051701 A | 9/2014 |

(Continued)

OTHER PUBLICATIONS

International Search Report and Written Opinion of the International Searching Authority dated Feb. 12, 2019 for PCT/US2018/062121 filed Nov. 20, 2018, 13 pgs.

*Primary Examiner* — Matthew T Martin
*Assistant Examiner* — Bartholomew A Hornsby
(74) *Attorney, Agent, or Firm* — Boardman & Clark LLP

(57) ABSTRACT

An overcharge protection device cover assembly for use with a battery cell housing. The battery cell housing has a first terminal and a second terminal, the overcharge protection device cover assembly including a first terminal pad having a first length. The first terminal pad is contactable with the first terminal of the battery cell housing. The assembly also includes a second terminal pad having a second length that is greater than the first length. The second terminal pad is contactable with the second terminal of the battery cell housing. A reversal device of the assembly is deflectable toward the first and second terminal pads. A conductive element of the assembly is positioned between the reversal device and the first and second terminal pads.

19 Claims, 3 Drawing Sheets

(58) Field of Classification Search
CPC ............. H01M 50/584; H01M 50/586; H01M 50/588; H01M 50/59; H01M 50/591; H01M 50/593; H01M 50/595; H01M 50/597; H01M 50/103; H01M 50/176; H01M 50/147; H01M 50/528; H01M 50/531–536; H01M 50/543; H01M 50/547; H01M 50/548; H01M 50/55; H01M 50/552; H01M 50/553; H01M 50/559; H01M 50/562; H01M 50/564; H01M 50/566; H01M 50/567; H01M 50/569; H01M 50/296

See application file for complete search history.

(56) References Cited

U.S. PATENT DOCUMENTS

2014/0272492 A1\* 9/2014 Lange ................. H01M 50/578
429/61
2015/0104672 A1 4/2015 Cai et al.

FOREIGN PATENT DOCUMENTS

| CN | 206134740 U | 4/2017 |
| EP | 2299512 A1 | 3/2011 |

\* cited by examiner

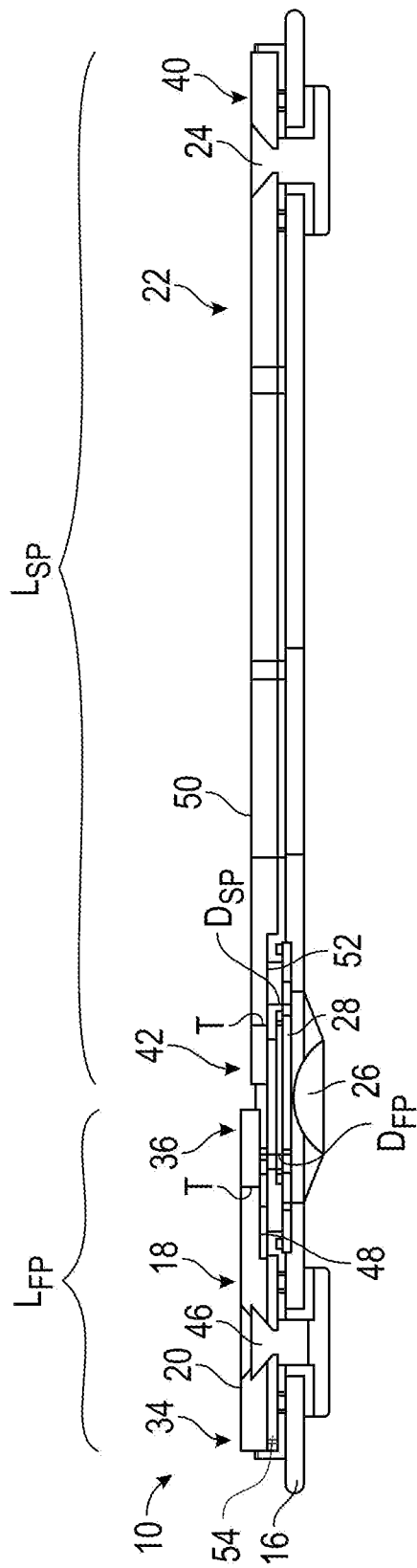
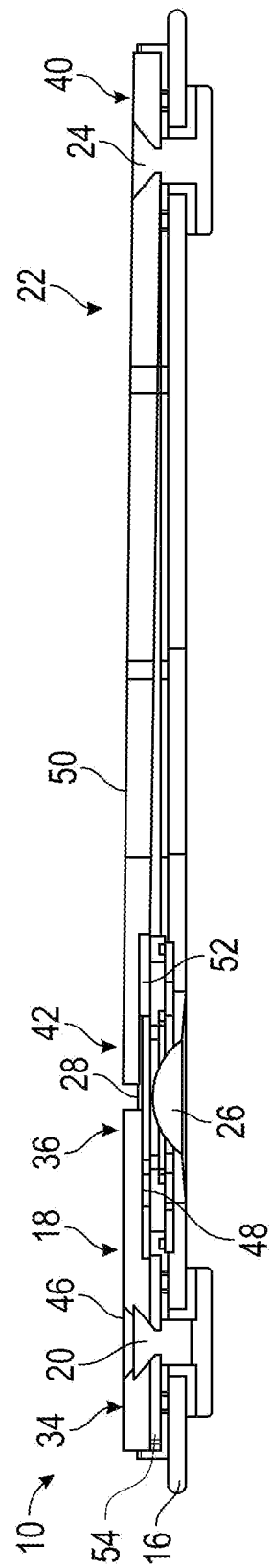
FIG. 2
FIG. 3

OVERCHARGE PROTECTION DEVICE WITH UNEVEN TERMINAL PADS

CROSS REFERENCE TO RELATED APPLICATIONS

This application is a national phase filing of International Patent Application No. PCT/US2018/062121, entitled "OVERCHARGE PROTECTION DEVICE WITH UNEVEN TERMINAL PADS," which has an international filing date of Nov. 20, 2018, and which claims priority from and the benefit of U.S. Provisional Application Ser. No. 62/588,581, entitled "OVERCHARGE PROTECTION DEVICE WITH UNEVEN TERMINAL PADS," filed Nov. 20, 2017, the entirety of all of which are hereby incorporated by reference herein for all purposes.

BACKGROUND

The present disclosure relates generally to the field of batteries and battery cells. More specifically, the present disclosure relates to features of a battery cell that may protect a battery cell from thermal runaway during an overcharge event.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

When charging a rechargeable battery cell, the chemical reactions within the battery cell may cause an increase in temperature. Some types of battery cells, such as those of lithium-ion (Li-ion) batteries, may be susceptible to thermal runaway, in which the temperature increase caused by the charge cycle causes a further increase in temperature. Thermal runaway can compromise or destroy the battery cell, but also cause damage to the charger and the housing and/or device in which the battery cell is located.

As technology continues to evolve, there is a need to provide improved power sources, particularly battery cells and battery modules, for such systems that may be powered by or store their energy using battery technologies. For example, certain types of battery modules may undergo overcharge testing to determine boundaries and/or limits of the battery module and its individual battery cells. Additionally, in certain instances, for example due to changing environmental conditions or other operating conditions, battery cells may be subject to overcharging. Overcharge tests and overcharging may lead to thermal runaway. Therefore, it is recognized that a need exists for devices that may prevent or block thermal runaway.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to an overcharge protection device cover assembly for use with a battery cell housing, the battery cell housing having a first terminal and a second terminal, the overcharge protection device cover assembly comprising: a first terminal pad having a first length, the first terminal pad being contactable with the first terminal of the battery cell housing; a second terminal pad having a second length that is greater than the first length, the second terminal pad being contactable with the second terminal of the battery cell housing; a reversal device that is deflectable toward the first and second terminal pads; and a conductive element between the reversal device and the first and second terminal pads.

The present disclosure also relates to an overcharge protection device cover assembly, the overcharge protection device cover assembly having a base plate including a reversal device, the reversal device being transitionable between a first configuration and a second configuration; a first terminal pad having a first length; a second terminal pad having a second length that is greater than the first length; a conductive element between the reversal device and the first and second terminal pads; and a spacer plate between the base plate and the first terminal pad. The first terminal pad is a first distance from the base plate when the reversal device is in the first configuration and the second terminal pad is a second distance from the base plate when the reversal device is in the first configuration, the first distance being greater than the second distance.

The present disclosure also relates to a battery cell having a battery cell housing, the battery cell housing including first terminal and a second terminal; and an overcharge protection device cover assembly affixable to the battery cell housing. The overcharge protection device cover assembly includes a base plate coupled to the battery cell housing between the first and second terminals, the base plate having a reversal device that is transitionable between a first configuration and a second configuration; a first terminal pad having a first end portion, a second end portion opposite the first end portion, and a first length, the first end portion of the first terminal pad being in contact with the first terminal; a second terminal pad having a first end portion, a second end portion opposite the first end portion, and a second length that is greater than the first length, the first end portion of the second terminal pad being in contact with the second terminal. The battery cell also includes a conductive element between the reversal device and the first and second terminal pads; and a spacer plate between the base plate and the first terminal pad, the first terminal pad being a first distance from the base plate when the reversal device is in the first configuration and the second terminal pad being a second distance from the base plate when the reversal device is in the first configuration, the first distance being greater than the second distance.

DRAWINGS

Various aspects of this disclosure may be better understood upon reading the following detailed description and upon reference to the drawings in which:

FIG. 2 is a cross-sectional view of a first embodiment of the overcharge protection device cover assembly in a normal operating condition in accordance with the present disclosure;

FIG. 3 is a cross-sectional view of the first embodiment of the overcharge protection device cover assembly in an electrical short circuit condition in accordance with the present disclosure;

DETAILED DESCRIPTION

Figure 1:
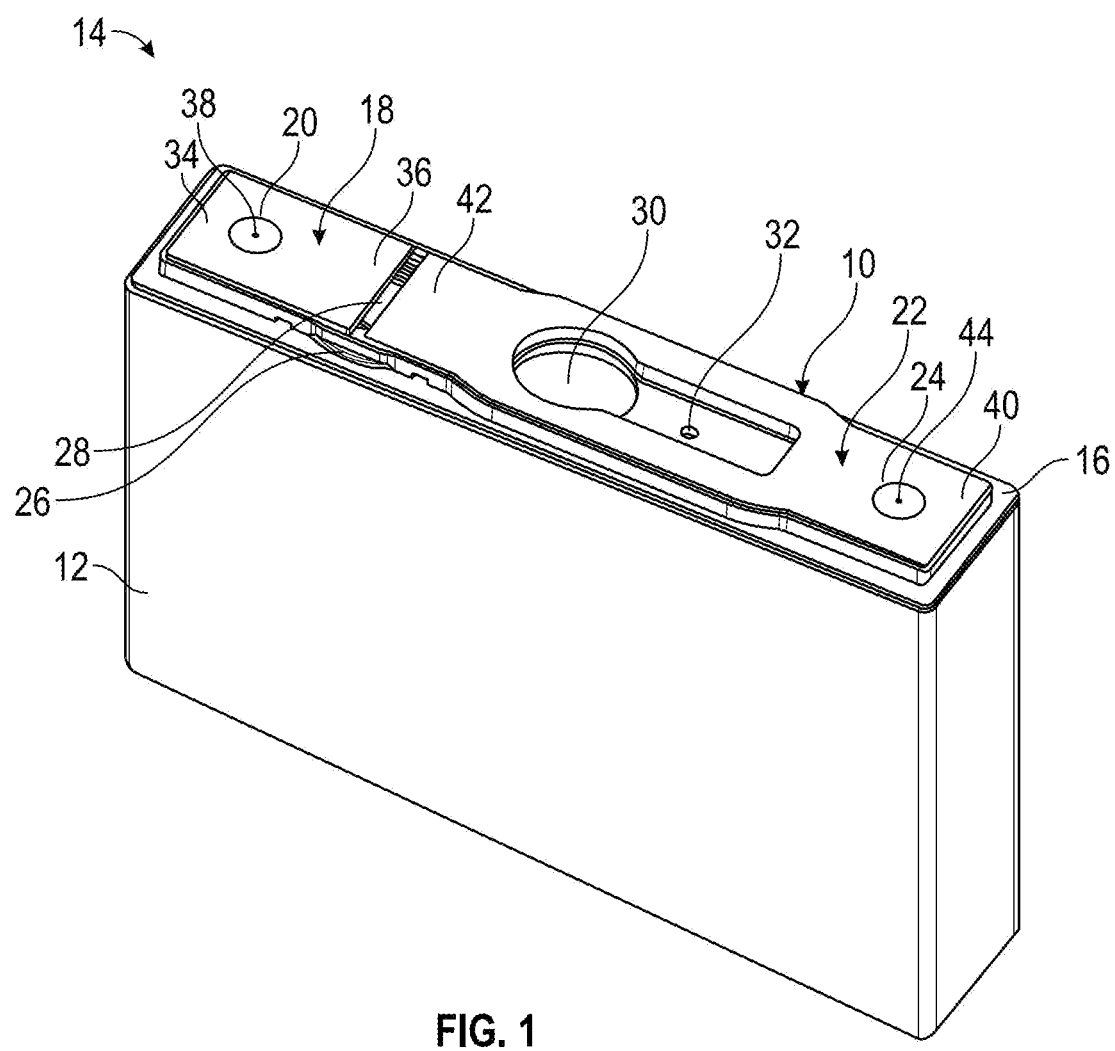
FIG. 1 is a perspective view of a battery cell having an overcharge protection device cover assembly in accordance with the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring now to the drawings, an overcharge protection device cover assembly 10 constructed in accordance with the principles of the present disclosure is shown in FIGS. 1-5. The overcharge protection device cover assembly 10 is shown coupled to a battery cell housing 12 in FIG. 1. The overcharge protection device cover assembly 10 and the battery cell housing 12 are collectively referred to herein as a battery cell 14. In one embodiment, the overcharge protection device cover assembly 10 includes a base plate 16 configured to be in contact with, adjacent, or coupled to the battery cell housing 12, a first (or negative) terminal pad 18 in contact with a first (or negative) terminal 20, a second (or positive) terminal pad 22 in contact with a second (or positive) terminal 24, a reversal device 26 (reversal device 26 is not visible in FIG. 2), and a conductive element 28 between the reversal device 26 and the first 18 and second 22 terminal pads. In some embodiments the conductive element 28 is in the shape of disk, but other shapes can be used depending in design requirements, e.g., rectangle, square, etc. In some embodiments, the reversal device 26 is shaped in the form of a disk, but other shapes can be implemented depending on design requirements. In some embodiments, the reversal device is formed of a metal or polymer that allows the inner portion of the deflection device 26 to deflect from a first position to a second position, the second position allowing activation of the overcharging protection by electrically short-circuiting the battery terminals. In one embodiment, the overcharge protection device cover assembly 10 is configured to be coupled to a surface of the battery cell housing 12 between the first 20 and second 24 terminals. In one embodiment, the reversal device 26 is integrated with, defined by, or coupled to the base plate 16, and at least a portion of the reversal device 26 is deflectable. Further, the reversal device 26 may be composed of a more flexible material or may be thinner than the base plate 16, such that internal pressure within the battery cell housing 12 is able to deflect the reversal device 26 but not the base plate 16. The conductive element 28 is movable, at least in a linear direction that is orthogonal to, or at least substantially orthogonal to, the base plate 16. However, it will be understood that the first terminal pad 18 and first terminal 20 may instead be a positive terminal pad and positive terminal, and the second terminal pad 22 and second terminal 24 may instead be a negative terminal pad and negative terminal. In some embodiments, the overcharge protection device cover assembly 10 also includes a vent aperture 30 configured to be aligned with a vent (not shown) in the battery cell housing 12 when the overcharge protection device cover assembly 10 is coupled to the battery cell housing 12. In some embodiments, the overcharge protection device cover assembly 10 also includes an electrolyte aperture 32 to enable the addition of electrolyte to battery cell within the battery cell housing 12.

Figure 4:
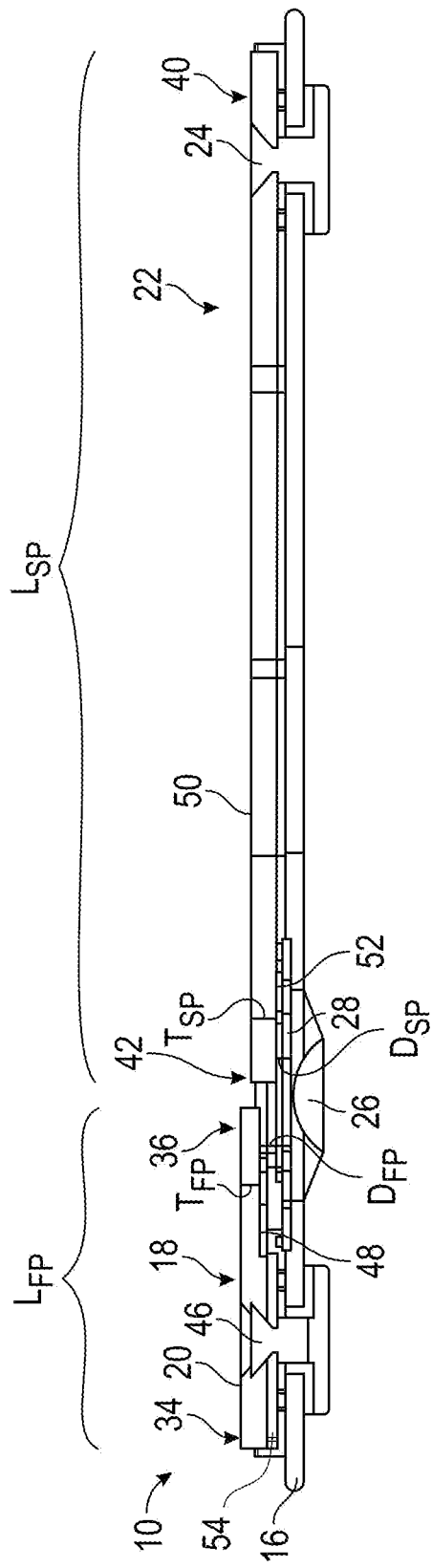
FIG. 4 is a cross-sectional view of a second embodiment of an overcharge protection device cover assembly in a normal operating condition in accordance with the present disclosure.
Figure 5:
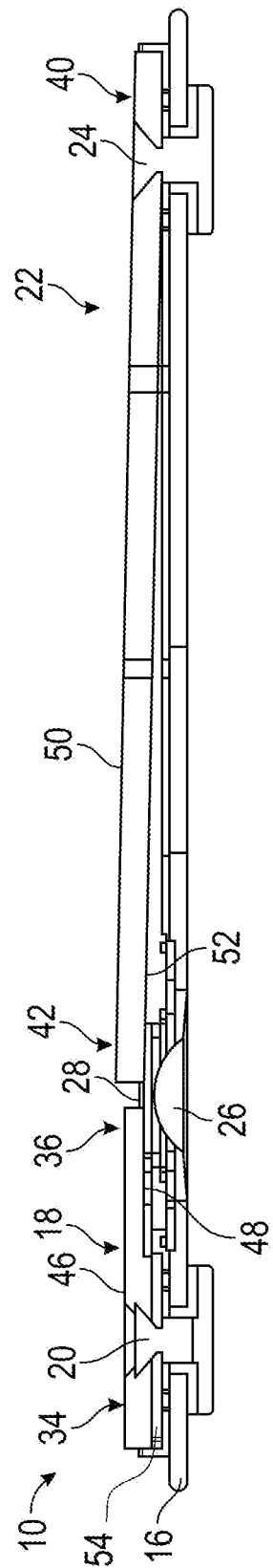
FIG. 5 is a cross-sectional view of the second embodiment of the overcharge protection device cover assembly in an electrical short circuit condition in accordance with the present disclosure.

The overcharge protection device cover assembly 10 includes asymmetric first 18 and second 22 terminal pads. In one embodiment, the second terminal pad 22 has a length $L_{SP}$ that is less than a length $L_{FP}$ of the first terminal pad 18 (for example, as shown in FIG. 2). Alternatively, the first terminal pad 18 may have a length $L_{FP}$ that is less than the length $L_{SP}$ of the second terminal pad 22. Further, the first 18 and second 22 terminal pads are in contact with or coupled to the first 20 and second 24 terminals, respectively. In one embodiment, the first terminal pad 18 includes a first end portion 34 that is in contact with or coupled to the first terminal 20 and a second end portion 36 opposite the first end portion 34. The second end portion 36 is not coupled to any other component of the overcharge protection device cover assembly 10, and is freely movable relative to the base plate 16 in a linear direction that is crosswise (e.g., orthogonal) to the base plate 16. Thus, the first end portion 34 of the first terminal pad 18 includes a pivot point 38 at the first terminal 20 about which the first terminal pad 18 may move. Likewise, the second terminal pad 22 includes a first end portion 40 that is in contact with or coupled to the second terminal 24 and a second end portion 42 opposite the first end portion 40. The second end portion 42 is not coupled to any other component of the overcharge protection device cover assembly 10, and is freely movable relative to the base plate 16 in a linear direction that is orthogonal to, or at least substantially orthogonal to, the base plate 16. Thus, the first end portion 40 of the second terminal pad 22 includes a pivot point 44 at the second terminal 24 about which the second terminal pad 22 may move. As such, the overcharge protection device cover assembly 10 is transitionable from a first configuration (for example, as in a normal operating condition, as shown in FIGS. 2 and 4) to a second configuration (for example, as in an electrical short circuit condition, as shown in FIGS. 3 and 5). Although the second end portions 36, 42 are disclosed herein as being movable in a linear direction relative to the base plate 16, it will be understood that the second end portions 36, 42 will move about their corresponding pivot points in an arc, albeit a small arc.

Referring now to FIGS. 2 and 3, a first embodiment of an overcharge protection device cover assembly 10 is shown. The reversal device 26 is deflectable or transitionable between a first (inverted) configuration and a second (everted) configuration, and transition of the reversal device 26 between the first and second configurations causes the overcharge protection device cover assembly 10 as a whole to transition between the first and second configurations. In a normal operating condition (e.g., before the reversal device 26 is deflected from an increase in internal pressure within the battery cell), as shown in FIG. 3, the first 18 and second 22 terminal pads are uneven in height, although they each lie in a plane that is parallel to, or at least substantially parallel to, the plane in which the base plate 16 lies. The first terminal pad 18 includes a first (or upper) surface 46 and a second (or lower) surface 48 opposite the first surface 46. Likewise, the second terminal pad 22 includes a first (or upper) surface 50 and a second (or lower) surface 52 opposite the first surface 50. When the overcharge protection device cover assembly 10 is in a normal operating condition (for example, as shown in FIG. 2), the first surface 46 of the first terminal pad 18 and the first surface 50 of the second terminal pad 22 are located at different distances from the base plate 16, the reversal device 26, and the conductive element 28. The second surface 48 of the first terminal pad 18 and the second surface 52 of the second terminal pad 22 are also located at different distances from the base plate 16, the reversal device 26, and the conductive element 28. For example, the second surface 48 of the first terminal pad 18 is located a first distance DFP from the base plate 16 and the second surface 52 of the second terminal pad 22 is located a second distance Dsp from the base plate 16. To accomplish this, the overcharge protection device cover assembly 10 also includes a spacer plate 54 between the base plate 16 and the first terminal pad 18, thereby positioning the first terminal pad 18 at a greater distance from the base plate 16, the reversal device 26, and the conductive element 28. In one embodiment, the spacer plate 54 lies in a plane that is parallel to, or at least substantially parallel to, the base plate 16. The cross-sectional view of FIG. 2 shows that the first terminal pad 18 and the second terminal pad 22 are not coplanar when the overcharge protection device cover assembly 10 is in the normal operating condition.

Further, each terminal pad 18, 22 has a working thickness T. The working thickness T is the thickness of at least the second end portion 36, 54 of each terminal pad 18, 34 proximate the conductive element 28, at the location with which the conductive element 28 comes into contact with each terminal pad 18, 34 when the overcharge protection device cover assembly 10 is in the short condition. In the embodiment shown in FIGS. 2 and 3, the working thickness T of each terminal pad 18, 22 is the same.

In an electrical short circuit condition (that is, after the reversal device 26 is deflected from an increase in internal pressure within the battery cell), as shown in FIG. 3, deflection of the reversal device 26 exerts a force against the conductive element 28, moving the conductive element 28 toward and into contact with the second surface 48 of the first terminal pad 18 and then the second surface 52 of the second terminal pad 22. As the second terminal pad 22 is located closer to the base plate 16, the reversal device 26, and the conductive element 28 (due to the lack of a spacer plate 54 between the base plate 16 and the second terminal pad 22), deflection of the reversal device 26 will cause the conductive element 28 to come into contact with the second surface 52 of the second terminal pad 22 before the second surface 48 of the first terminal pad 18. Additionally, as the second terminal pad 22 has a greater length $L_{SP}$ than the length $L_{FP}$ of the first terminal pad 18, the second terminal pad 22 is more easily pivoted at its pivot point 44 and moved linearly until at least a portion of the second end portion 42 of the second terminal pad 22 is at the same distance from the base plate 16 as at least a portion of the second end portion 36 of the first terminal pad 18 (for example, as shown in FIG. 3). In one embodiment, at least a portion of the second surface 48 of the first terminal pad 18 and at least a portion of the second surface 52 of the second terminal pad 22 are aligned, as they are both in contact with the conductive element 28 when the overcharge protection device cover assembly 10 is in the electrical short circuit condition. In the electrical short circuit condition, the conductive element 28 is in contact with both the first terminal pad 18 and the second terminal pad 22, establishing a short circuit to prevent the battery cell from overcharging. When the conductive element 28 is in contact with both terminal pads 18, 22, the second terminal pad 22 may be pivoted about its pivot point 44, thereby creating an angle between the plane in which the base plate 16 lies and the plane in which the second terminal pad 22 lies. This angle may be very small, such as approximately 10° or less in some embodiments. Further, as the second end portion 36 of the first terminal pad 18 and second end portion 42 of the second terminal pad 22 are aligned when the overcharge protection device cover assembly 10 is in the electrical short circuit condition and reversal device 26 is fully deflected (everted), with the conductive element 28 is at the its furthest distance from the base plate 16, rather than when the overcharge protection device cover assembly 10 is in the normal operating condition, much less precision is required during manufacture and assembly. Further, the configuration of the first 18 and second 22 terminal pads ensures the conductive element 28 will reliably contact both terminal pads 18, 22 to establish a short circuit when overcharge protection is needed. It will be understood that although FIG. 3 shows that the terminal pads 18, 22 are not coplanar when the overcharge protection device cover assembly 10 is in the normal operating condition, and that at least a portion of each of the first surfaces 46, 50 of the terminal pads 18, 22 are aligned when the overcharge protection device cover assembly 10 is in the electrical short circuit condition, the terminal pads 18, 22 may be configured differently that that shown, provided the conductive element 28 contacts one of the terminal pads 18, 22 before the other when the reversal device 26 deflects to move the conductive element 28 toward the terminal pads 18, 22.

Referring now to FIGS. 4 and 5, a second embodiment of an overcharge protection device cover assembly 10 is shown. The second embodiment of the overcharge protection device cover assembly 10 of FIGS. 4 and 5 is similar to the first embodiment of the overcharge protection device cover assembly 10 of FIGS. 2 and 3 and, therefore, the same references numbers are used. However, unlike the first embodiment of the overcharge protection device cover assembly 10, the second embodiment of the overcharge protection device cover assembly 10 includes first 18 and second 22 terminal pads with different working thicknesses $T_{FP}$ and Tsp at the second end portion 36 of the first terminal pad 18 proximate the conductive element 28 and at the second end portion 42 of the second terminal pad 22 proximate the conductive element 28. In one embodiment, the second terminal pad 22 has a working thickness Tsp that is greater than the working thickness $T_{FP}$ of the first terminal pad 18.

When the overcharge protection device cover assembly 10 is in the normal operating condition, the first 18 and second 22 terminal pads are uneven in height. That is, the first surface 46 of the first terminal pad 18 and the first surface 50 of the second terminal pad 22 are located at different distances from the base plate 16, the reversal device 26, and the conductive element 28. The second surface 48 of the first terminal pad 18 and the second surface 52 of the second terminal pad 22 are also located at different distances from the base plate 16, the reversal device 26, and the conductive element 28. For example, the second surface 48 of the first terminal pad 18 is located a first distance $D_{FP}$ from the base plate 16 and the second surface 52 of the second terminal pad 22 is located a second distance Dsp from the base plate 16. To accomplish this, the overcharge protection device cover assembly 10 includes s spacer plate 54 between the base plate 16 and the first terminal pad 18. The cross-sectional view of FIG. 5 shows that the first terminal pad 18 and the second terminal pad 22 are not coplanar when the overcharge protection device cover assembly 10 is in the normal operating condition.

In the electrical short circuit condition, as shown in FIG. 5, deflection of the reversal device 26 exerts a force against the conductive element 28, moving the conductive element 28 toward and into contact with the second surface 48 of the first terminal pad 18 and the second surface 52 of the second terminal pad 22. As the second terminal pad 22 is located closer to the base plate 16, the reversal device 26, and the conductive element 28 (due to the lack of a spacer plate 54 between the base plate 16 and the second terminal pad 22), deflection of the reversal device 26 will case the conductive element 28 to come into contact with the second surface 52 of the second terminal pad 22 before the second surface 48 of the first terminal pad 18. Additionally, as the second terminal pad 22 has a greater length $L_{SP}$ than the length $L_{FP}$ of the first terminal pad 18, the second terminal pad 22 is more easily pivoted at its pivot point 44 and moved linearly until at least a portion of the second end portion 42 of the second terminal pad 22 is at the same distance from the base plate 16 as at least a portion of the second end portion 36 of the first terminal pad 18 (for example, as shown in FIG. 3). In one embodiment, at least a portion of the second surface 48 of the first terminal pad 18 and at least a portion of the second surface 52 of the second terminal pad 22 are aligned, as they are both in contact with the conductive element 28 when the overcharge protection device cover assembly 10 is in the electrical short circuit condition. In the electrical short circuit condition, the conductive element 28 is in contact with both the first terminal pad 18 and the second terminal pad 22, establishing a short circuit to prevent the battery cell from overcharging. When the conductive element 28 is in contact with both terminal pads 30, 34, the second terminal pad 22 may be pivoted about its pivot point 44. Further, as the second end portion 36 of the first terminal pad 18 and second end portion 42 of the second terminal pad 22 are aligned when the overcharge protection device cover assembly 10 is in the electrical short circuit condition and reversal device 26 is fully deflected (everted), with the conductive element 28 is at the its furthest distance from the base plate 16, rather than when the overcharge protection device cover assembly 10 is in the normal operating condition, much less precision is required during manufacture and assembly. Further, the configuration of the first 18 and second 22 terminal pads ensures the conductive element 28 will reliably contact both terminal pads 18, 22 to establish a short circuit when overcharge protection is needed. It will be understood that although FIG. 2 shows that the terminal pads 18, 22 are not coplanar when the overcharge protection device cover assembly 10 is in the normal operating condition, and that at least a portion of each of the first surfaces 46, 50 of the terminal pads 18, 22 are aligned when the overcharge protection device cover assembly 10 is in the electrical short circuit condition, the terminal pads 18, 22 may be configured differently that that shown, provided the conductive element 28 contacts one of the terminal pads 18, 22 before the other when the reversal device 26 deflects to move the conductive element 28 toward the terminal pads 18, 22.

An overcharge protection device cover assembly constructed in accordance with the principles of the present disclosure provides certain benefits over currently known overcharge protection devices. For example, the overcharge protection device cover assemblies 10 disclosed herein each include terminal pads 18, 22 of unequal heights from the base plate 16 and conductive element 28 when the overcharge protection device cover assembly 10 is in a normal operating condition. This reduces manufacturing cost and complexity, as the terminal pads 18, 22 do not require precise alignment during assembly. Further, the terminal pads 18, 22 also are of unequal lengths (that is, the second terminal pads 22 are longer than the first terminal pads 18) to allow the longer terminal pad 22 to pivot more easily on its pivot point 44. During an electrical short circuit condition, deflection of the reversal device 26 causes the conductive element 28 to contact the longer second terminal pad 22 before the shorter first terminal pad 18. When the reversal device 26 is fully deflected and the conductive element 28 has been moved to its farthest position from the base plate 16, the first 18 and second 22 terminal pads are aligned. This configuration ensures that the conductive element 28 will reliably contact both the first 18 and second 22 terminal pads to establish a short circuit when overcharge protection is needed. In contrast, prior art overcharge protection devices require precisely aligned terminal pads for reliable overcharge protection, which increases manufacturing cost and complexity.

In one embodiment, an overcharge protection device cover assembly 10 for use with a battery cell housing 12 having first terminal 20 and a second terminal 24 includes a first terminal pad 18 having a first length $L_{FP}$, the first terminal pad 18 being contactable with the first terminal 20 of the battery cell housing 12, and a second terminal pad 22 having a second length $L_{SP}$ that is greater than the first length $L_{FP}$, the second terminal pad 22 being contactable with the second terminal 24 of the battery cell housing 12. The overcharge protection device cover assembly 10 also includes a reversal device 26 that is deflectable toward the first 18 and second 22 terminal pads and a conductive element 28 between the reversal device 26 and the first 18 and second 22 terminal pads.

In one aspect of the embodiment, the first terminal pad 18 includes a first end portion 34 and a second end portion 36 opposite the first end portion 34 and the second terminal pad 22 includes a first end portion 40 and a second end portion 42 opposite the first end portion 40, the first end portion 40 of the first terminal pad 18 being contactable with the first terminal 20 of the battery cell housing 12 and the first end portion 40 of the second terminal pad 22 being contactable with the second terminal 24 of the battery cell housing 12. In one aspect of the embodiment, the first terminal pad 18 includes a first pivot point 38 about which the first terminal pad 18 is pivotable and the second terminal pad 22 includes a second pivot point 44 about which the second terminal pad 22 is pivotable. In one aspect of the embodiment, the overcharge protection device cover assembly 10 further includes a base plate 16, the base plate 16 defining the reversal device 26, and a spacer plate 54 between the base plate 16 and the first terminal pad 18. In one aspect of the embodiment, the second end portion 36 of the first terminal pad 18 and the second end portion 42 of the second terminal pad 22 are each movable in a direction that is orthogonal to a plant of the base plate 16.

In one aspect of the embodiment, the reversal device 26 is transitionable between a first configuration and a second configuration. In one aspect of the embodiment, the first terminal pad 18 is a first distance from the reversal device 26 when the reversal device 26 is in the first configuration and the second terminal pad 22 is a second distance from the reversal device 26 when the reversal device 26 is in the first configuration, the first distance being greater than the second distance.

In one aspect of the embodiment, each of the first and second terminal pads includes a working thickness T, the working thickness T of the first terminal pad and the working thickness T of the second terminal pad being the same.

In one aspect of the embodiment, the first terminal pad 18 includes a first working thickness $T_{FP}$ and the second terminal pad 22 includes a second working thickness $T_{SP}$ that is greater than the first working thickness $T_{FP}$.

In one aspect of the embodiment, transition of the reversal device 26 from the first configuration to the second configuration causes the conductive element 28 to contact the second terminal pad 22 before the conductive element 28 contacts the first terminal pad 18.

In one embodiment, an overcharge protection device cover assembly 10 includes a base plate 16 including a reversal device 26, the reversal device 26 being transitionable between a first configuration and a second configuration, a first terminal pad 18 having a first length $L_{FP}$, a second terminal pad 22 having a second length $L_{SP}$ that is greater than the first length $L_{FP}$, a conductive element 28 between the reversal device 26 and the first 18 and second 22 terminal pads, and a spacer plate 54 between the base plate 16 and the first terminal pad 18. The first terminal pad 18 is a first distance from the base plate 16 when the reversal device 26 is in the first configuration and the second terminal pad 22 is a second distance from the base plate 16 when the reversal device 26 is in the first configuration, the first distance being greater than the second distance.

In one aspect of the embodiment, each of the first and second terminal pads includes a working thickness T, the working thickness T of the first terminal pad and the working thickness T of the second terminal pad being the same.

In one aspect of the embodiment, the first terminal pad 18 includes a first working thickness $T_{FP}$ and the second terminal pad 22 includes a second working thickness Tsp that is greater than the first working thickness $T_{FP}$.

In one aspect of the embodiment, transition of the reversal device 26 from the first configuration to the second configuration causes the conductive element 28 to contact the second terminal pad 22 before the conductive element 28 contacts the first terminal pad 18.

In one embodiment, a battery cell 14 includes a battery cell housing 12, the battery cell housing 12 including first terminal 20 and a second terminal 24, and an overcharge protection device cover assembly 10 affixable to the battery cell housing 12. The overcharge protection device cover assembly 10 includes: a base plate 16 coupled to the battery cell housing 12 between the first 32 and second 36 terminals, the base plate 16 having a reversal device 26 that is transitionable between a first configuration and a second configuration; a first terminal pad 18 having a first end portion 34, a second end portion 36 opposite the first end portion 34, and a first length $L_{FP}$, the first end portion 34 of the first terminal pad 18 being in contact with the first terminal 20; a second terminal pad 22 having a first end portion 40, a second end portion 42 opposite the first end portion 40, and a second length $L_{SP}$ that is greater than the second length $L_{FP}$, the first end portion 40 of the second terminal pad 22 being in contact with the second terminal 24; a conductive element 28 between the reversal device 26 and the first 30 and second 34 terminal pads; and a spacer plate 54 between the base plate 16 and the first terminal pad 18. The first terminal pad 18 is a first distance from the base plate 16 when the reversal device 26 is in the first configuration and the second terminal pad 22 is a second distance from the base plate 16 when the reversal device 26 is in the first configuration, the first distance being greater than the second distance.

In one aspect of the embodiment, the second end portion of each of the first and second terminal pads includes a working thickness T, the working thickness T of the second end portion of each of the first terminal pad and the working thickness T of the second terminal pad being the same.

In one aspect of the embodiment, the second end portion of the first terminal pad 18 has a first working thickness $T_{FP}$ and the second end portion of the second terminal pad 22 has a second working thickness $T_{SP}$ that is greater than the first working thickness $T_{FP}$.

In one aspect of the embodiment, transition of the reversal device 26 from the first configuration to the second configuration causes the conductive element 28 to contact the second terminal pad 22 before the conductive element 28 contacts the first terminal pad 18.

In one aspect of the embodiment, the conductive element 28 is in contact with the first 30 and second 34 terminal pads when the conductive element 28 is in the second configuration. In one aspect of the embodiment, a short circuit is established in the battery cell 14 when the conductive element 28 is in the second configuration.

One or more of the disclosed embodiments, alone or in combination, may provide one or more technical effects useful in the manufacture of battery cells, and portions of battery cells. The disclosed embodiments relate to battery cells that include an overcharge protection assembly. The overcharge protection assembly may include a reversal device that is activated when a pressure in a casing of the battery cell reaches a threshold value. The activation of the reversal device may cause electrical contact between terminals of the battery cell, which may create an external circuit by electrically coupling the positive terminal and the negative terminal of the battery cell. Such an external short circuit may discharge the battery cell, but the external short circuit may prevent thermal runaway and/or permanent damage to the battery cell. Additionally or alternatively, the short circuit may cause a large amount of current to be transmitted through an internal current collector of the battery cell, which may cause the current collector to melt and thereby cut the flow of electric current. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. An overcharge protection device cover assembly for use with a battery cell housing, the battery cell housing having a first terminal and a second terminal, the overcharge protection device cover assembly comprising:

a first terminal pad having a first end portion and a second end portion opposite the first end portion, the first end portion and the second end portion defining an LFP distance and the first terminal pad being contactable with the first terminal of the battery cell housing;

a second terminal pad having a third end portion and a fourth end portion opposite the third end portion, the third end portion and the fourth end portion defining an LSP distance that is greater than the LFP distance, the second terminal pad being contactable with the second terminal of the battery cell housing;

a reversal device that is deflectable toward the first and second terminal pads, wherein the reversal device is transitionable between a first configuration and a second configuration, wherein the first terminal pad is a DFP distance from the reversal device to a bottom surface of the first terminal pad when the reversal device is in the first configuration and the second terminal pad is a DSP distance from the reversal device to a bottom surface of the second terminal pad when the reversal device is in the first configuration, and wherein the DFP distance and the DSP distance are different from one another; and a conductive element between the reversal device and the first and second terminal pads.

2. The overcharge protection device cover assembly of claim 1, wherein
the first end portion of the first terminal pad is contactable with the first terminal of the battery cell housing and the first end portion of the second terminal pad is contactable with the second terminal of the battery cell housing.

3. The overcharge protection device cover assembly of claim 2, wherein the first terminal pad includes a first pivot point about which the first terminal pad is pivotable and the second terminal pad includes a second pivot point about which the second terminal pad is pivotable.

4. The overcharge protection device cover assembly of claim 3, further comprising:
a base plate, the base plate defining the reversal device; and
a spacer plate between the base plate and the first terminal pad.

5. The overcharge protection device cover assembly of claim 4, wherein the second end portion of the first terminal pad and the second end portion of the second terminal pad are each movable in a direction that is orthogonal to a plane of the base plate.

6. The overcharge protection device cover assembly of claim 1, wherein the DFP distance is greater than the DSP distance.

7. The overcharge protection device cover assembly of claim 6, wherein each of the first and second terminal pads includes a working thickness, the working thickness of the first terminal pad and the working thickness of the second terminal pad being the same.

8. The overcharge protection device cover assembly of claim 6, wherein the first terminal pad includes a first working thickness and the second terminal pad includes a second working thickness that is greater than the first working thickness.

9. The overcharge protection device cover assembly of claim 6, wherein transition of the reversal device from the first configuration to the second configuration causes the conductive element to contact the second terminal pad before the conductive element contacts the first terminal pad.

10. An overcharge protection device cover assembly, the overcharge protection device cover assembly comprising:
a base plate including a reversal device, the reversal device being transitionable between a first configuration and a second configuration;

a first terminal pad having a first end portion and a second end portion opposite the first end portion, the first end portion and the second end portion defining an LFP distance;

a second terminal pad having a third end portion and a fourth end portion opposite the third end portion, the third end portion and the fourth end portion defining an LSP distance that is greater than LFP distance;

a conductive element between the reversal device and the first and second terminal pads, the conductive element being separate from the first and second terminal pads; and a spacer plate between the base plate and the first terminal pad, the first terminal pad being a DFP distance from a top surface of the base plate to a bottom surface of the first terminal pad when the reversal device is in the first configuration and the second terminal pad being a DSP distance from a top surface of the base plate to a bottom surface of the second terminal pad when the reversal device is in the first configuration, the distance DFP distance being greater than the DSP distance.

11. The overcharge protection device cover assembly of claim 10, wherein each of the first and second terminal pads includes a working thickness, the working thickness of the first terminal pad and the working thickness of the second terminal pad being the same.

12. The overcharge protection device cover assembly of claim 10, wherein the first terminal pad includes a first working thickness and the second terminal pad includes a second working thickness that is greater than the first working thickness.

13. The overcharge protection device cover assembly of claim 10, wherein transition of the reversal device from the first configuration to the second configuration causes the conductive element to contact the second terminal pad before the conductive element contacts the first terminal pad.

14. A battery cell comprising:
a battery cell housing, the battery cell housing including first terminal and a second terminal; and
an overcharge protection device cover assembly affixable to the battery cell housing, the overcharge protection device cover assembly including:
a base plate coupled to the battery cell housing between the first and second terminals, the base plate having a reversal device that is transitionable between a first configuration and a second configuration;
a first terminal pad having a first end portion, a second end portion opposite the first end portion, and an LFP distance between the first end portion and the second end portion, the first end portion of the first terminal pad being in contact with the first terminal;
a second terminal pad having a first end portion, a second end portion opposite the first end portion, an LSP distance between the first end portion and the second end portion, wherein the LSP distance is greater than the LFP distance, the first end portion of the second terminal pad being in contact with the second terminal;
a conductive element between the reversal device and the first and second terminal pads; and
a spacer plate between the base plate and the first terminal pad,
the first terminal pad being a DFP distance from a top surface of the base plate to a bottom surface of the first terminal pad when the reversal device is in the first configuration and the second terminal pad being a DSP distance from a top surface of the base plate to a bottom surface of the second terminal pad when the reversal device is in the first configuration, the DFP distance being greater than the DSP distance.

15. The battery cell of claim 14, wherein the second end portion of each of the first and second terminal pads includes a working thickness, the working thickness of the second end portion of the first terminal pad and the working thickness of the second end portion of the second terminal pad being the same.

16. The battery cell of claim 14, wherein the second end portion of the first terminal pad has a first working thickness and the second end portion of the second terminal pad has a second working thickness that is greater than the first working thickness.

17. The battery cell of claim 14, wherein transition of the reversal device from the first configuration to the second configuration causes the conductive element to contact the second terminal pad before the conductive element contacts the first terminal pad.

18. The battery cell of claim 14, wherein the conductive element is in contact with the first and second terminal pads when the conductive element is in the second configuration.

19. The battery cell of claim 18, wherein a short circuit is established in the battery cell when the conductive element is in the second configuration.

* * * * *

UNITED STATES PATENT AND TRADEMARK OFFICE
CERTIFICATE OF CORRECTION

| | |
|---|---|
| PATENT NO. | : 11,539,103 B2 |
| APPLICATION NO. | : 16/764324 |
| DATED | : December 27, 2022 |
| INVENTOR(S) | : Zhang et al. |

It is certified that error appears in the above-identified patent and that said Letters Patent is hereby corrected as shown below:

In the Specification

In Column 3, Line 45, delete "depending in" and insert -- depending on --, therefor.

In Column 5, Line 15, delete "DFP" and insert -- $D_{FP}$ --, therefor.

In Column 5, Line 17, delete "Dsp" and insert -- $D_{SP}$ --, therefor.

In Column 5, Line 31, delete "second end portion 36, 54" and insert -- second end portions 36, 42 --, therefor.

In Column 6, Line 14, delete "at the its" and insert -- at its --, therefor.

In Column 6, Line 19, delete "ensures" and insert -- ensure --, therefor.

In Column 6, Line 29, delete "that that" and insert -- than that --, therefor.

In Column 6, Line 40, delete "references numbers" and insert -- reference numbers --, therefor.

In Column 6, Line 45, delete "Tsp" and insert -- TSP --, therefor.

In Column 6, Line 49, delete "Tsp" and insert -- TSP --, therefor.

In Column 6, Line 65, delete "Dsp" and insert -- DSP --, therefor.

In Column 7, Line 15, delete "will case" and insert -- will cause --, therefor.

In Column 7, Line 43, delete "at the its" and insert -- at its --, therefor.

Signed and Sealed this
Third Day of September, 2024

*Katherine Kelly Vidal*

Katherine Kelly Vidal
*Director of the United States Patent and Trademark Office*

CERTIFICATE OF CORRECTION (continued)
U.S. Pat. No. 11,539,103 B2

In Column 7, Line 48, delete "ensures" and insert -- ensure --, therefor.

In Column 7, Line 58, delete "that that" and insert -- than that --, therefor.

In Column 9, Line 40, delete "Tsp" and insert -- TSP --, therefor.

In the Claims

In Column 11, Line 22, in Claim 2, delete "wherein" and insert -- wherein: --, therefor.

In Column 12, Line 21, in Claim 10, delete "distance DFP" and insert -- DFP --, therefor.